Figure 4:
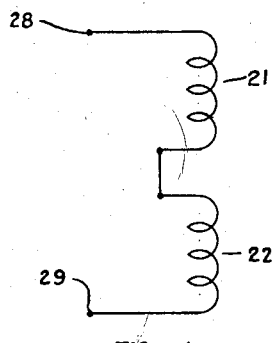

Dec. 29, 1959    J. C. SCHUESSLER    2,919,324
MAGNETIC SHUTTLE DEVICE
Filed Aug. 4, 1958    4 Sheets-Sheet 1
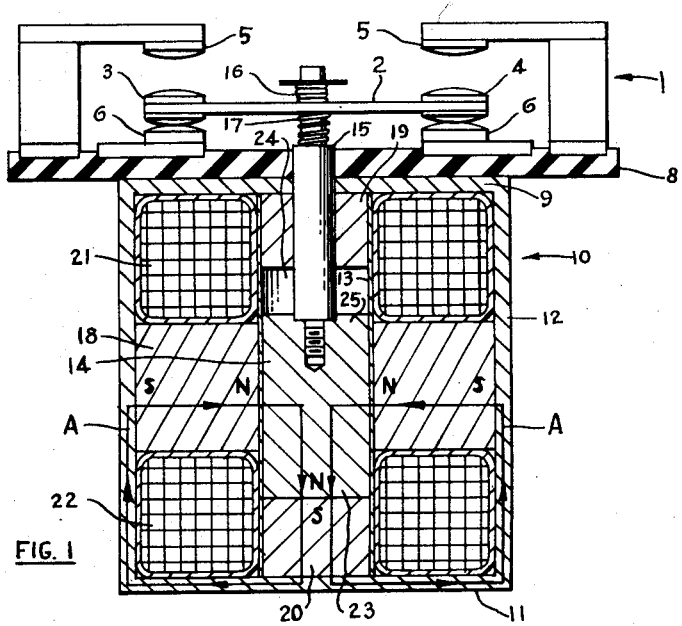
FIG. 1
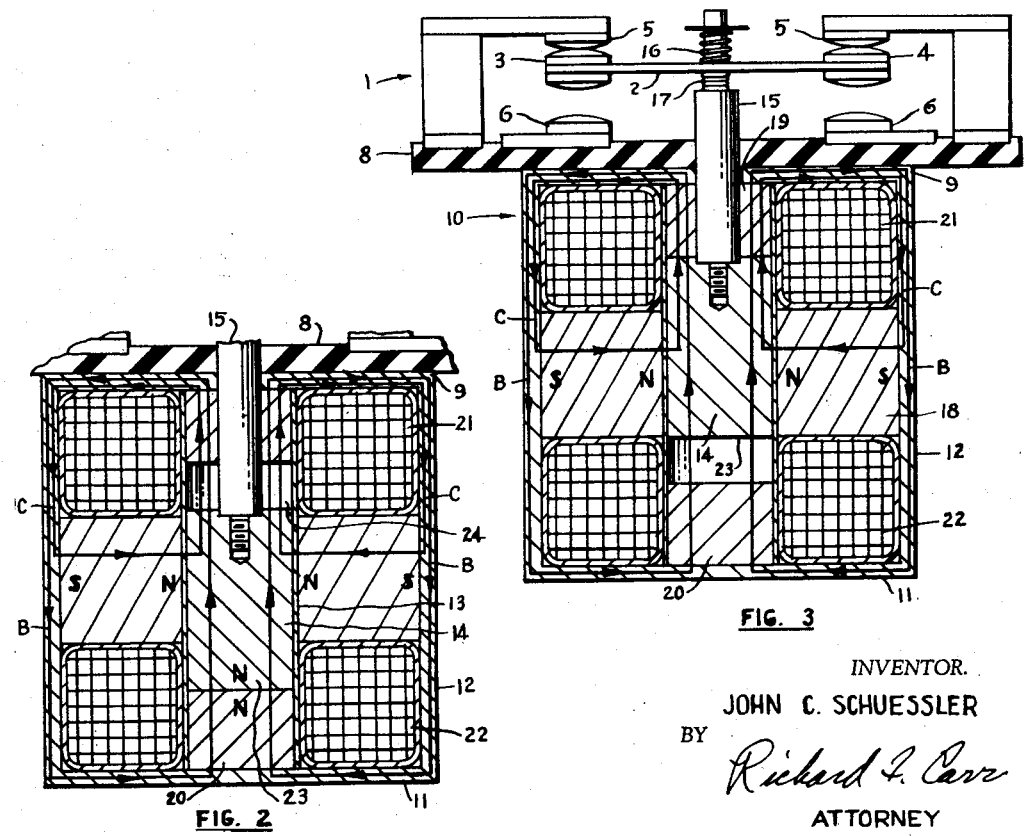
FIG. 2
FIG. 3
INVENTOR.
JOHN C. SCHUESSLER
BY
*Richard F. Carr*
ATTORNEY Dec. 29, 1959    J. C. SCHUESSLER    2,919,324
MAGNETIC SHUTTLE DEVICE Filed Aug. 4, 1958    4 Sheets-Sheet 2

INVENTOR.
JOHN C. SCHUESSLER
BY
Richard F. Carr
ATTORNEY

Dec. 29, 1959    J. C. SCHUESSLER    2,919,324
MAGNETIC SHUTTLE DEVICE
Filed Aug. 4, 1958    4 Sheets-Sheet 3

INVENTOR.
JOHN C. SCHUESSLER
BY
Richard F. Carr
ATTORNEY

Dec. 29, 1959     J. C. SCHUESSLER     2,919,324
MAGNETIC SHUTTLE DEVICE

Filed Aug. 4, 1958     4 Sheets-Sheet 4

INVENTOR.
JOHN C. SCHUESSLER
BY
*Richard F. Carr*
ATTORNEY

United States Patent Office 2,919,324
Patented Dec. 29, 1959

2,919,324

MAGNETIC SHUTTLE DEVICE

John C. Schuessler, West Covina, Calif., assignor to Leach Corporation

Application August 4, 1958, Serial No. 753,593

13 Claims. (Cl. 200—93)

This application is a continuation in part of my copending application for Magnetic Shuttle Device, Serial No. 715,945, filed February 18, 1958, and now abandoned.

This invention pertains to a magnetic shuttle device, and more particularly to such a device having a fixed stroke and held in position at the end of its stroke.

The device of this invention assumes either of two positions and is usable as a switching device, mechanical actuator or the like, wherever a reciprocative device is required. A permanent magnet is included which retains the reciprocative plunger at the end of its stroke. The flux path for the permanent magnet is such that when the plunger is moved from one end of its stroke to the other the force of the magnet on the plunger changes directions to assist in the movement, as well as to retain the plunger in its new position. In moving the plunger a magnetic field is set up by one or more coils which initially opposes the field of the permanent magnet and causes it to change direction. Alternatively, movement of the plunger in one direction may be accomplished by mechanical means, while a coil is utilized to switch the field of the permanent magnet for movement in the other. In all instances the coil need be energized only for a very brief time at relatively low power input. The field of the coil never passes through the permanent magnet, nor does it merely oppose and neutralize the field of the magnet.

Therefore, an object of this invention is to provide a shuttle device where the reciprocative member is retained at the end of its stroke.

Another object of this invention is to provide a shuttle device operable by a momentary impulse of a relatively low level of electrical energy.

An additional object of this invention is to provide a shuttle device having rapid movement through its stroke.

A further object of this invention is to provide a shuttle device employing a single permanent magnet to retain a reciprocative member at either end of its stroke.

Yet another object of this invention is to provide a shuttle device in which the flux path of a permanent magnet is caused to change directions in moving and retaining a reciprocative member.

A still further object of this invention is to provide a shuttle device of greater simplicity and economy of construction, and lighter in weight than conventional actuating units.

These and other objects will become apparent from the following detailed description, taken in connection with the accompanying drawing in which—

Figure 5:
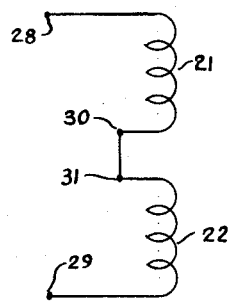
Figure 6:
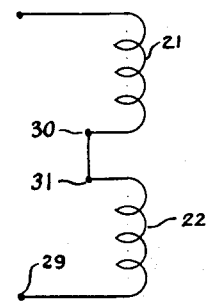
Figure 7:
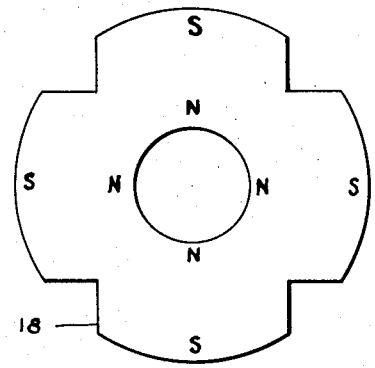
Figure 8:
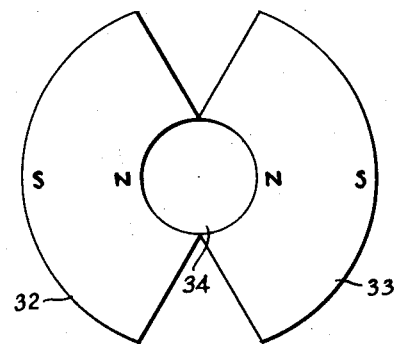
Figure 9:
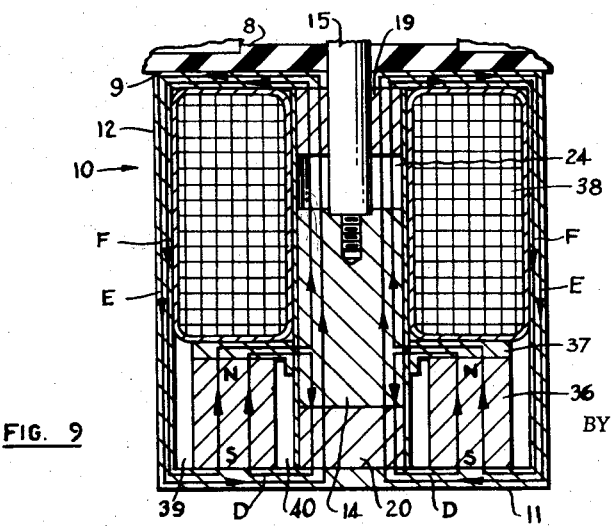
Figure 10:
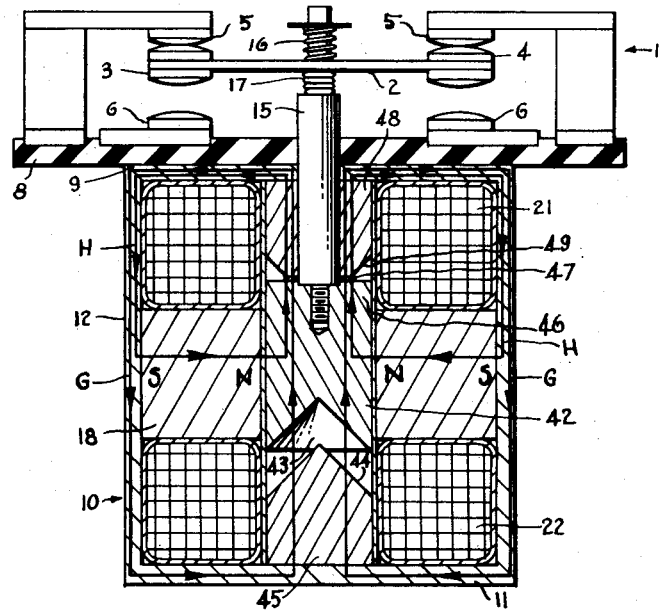
Figure 11:
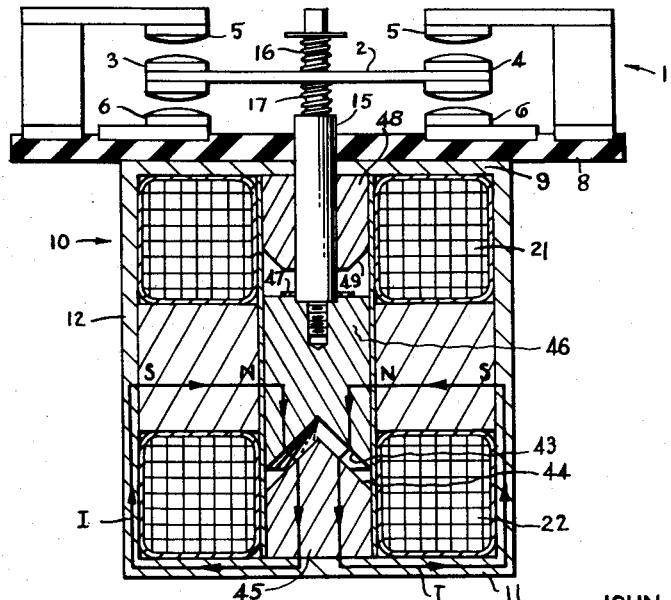
Figure 12:
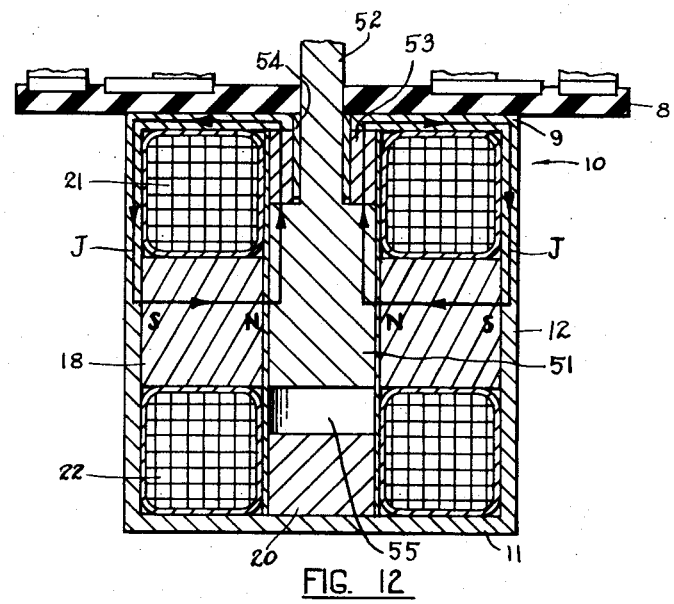
Figure 13:
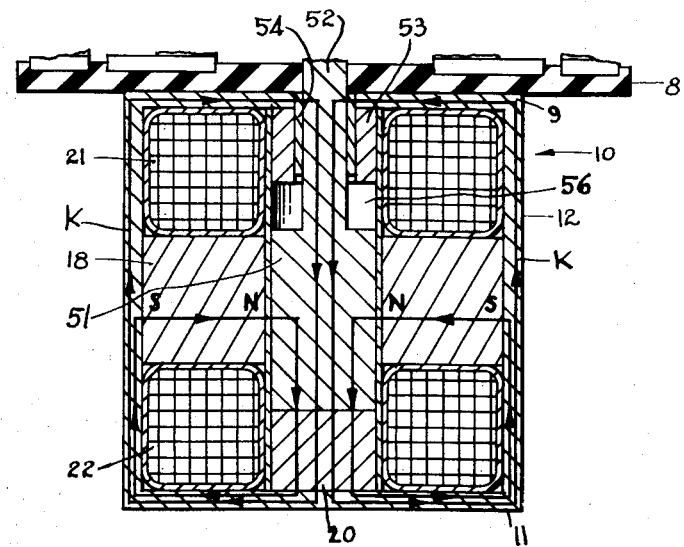

Fig. 1 is a sectional view of the invention illustrating the function of the permanent magnet in holding the reciprocative member at the end of its stroke, Fig. 2 is a sectional view, similar to that of Fig. 1, showing the manner in which the coils switch the flux path of the magnet for moving the reciprocative member through its stroke, Fig. 3 is a sectional view, similar to Figs. 1 and 2, showing the reciprocative member at the opposite end of its stroke, held by both the magnet and the coils, Fig. 4 is a schematic illustration of a circuit for the coils, Fig. 5 is a schematic illustration of a different circuit for the coils, Fig. 6 is a schematic illustration of still another circuit for the coils, Fig. 7 is a top plan view of the permanent magnet, formed from single element, Fig. 8 is a top plan view of a modified form of permanent magnet, assembled from two sections, Fig. 9 is a sectional view of a modified form of the invention where a single coil is used, Fig. 10 is a sectional view of a further modification of the invention where the coils are connected in a polarized manner, with the reciprocative member at one end of its stroke, Fig. 11 is a sectional view of the modification of Fig. 10, with the reciprocative member in a different position, Fig. 12 is a sectional view of still another modified form of the invention where the coils provide a greatly increased force on the reciprocative member as it moves through its stroke, with this member in one of its positions and the coils de-energized, and Fig. 13 is a sectional view similar to Fig. 12, but with the reciprocative member at the opposite end of its stroke and the coils energized.

Referring to the drawing, and in particular to Fig. 1, the device of this invention is shown by way of example as used for actuating a double throw contactor 1 which may be either normally open or normally closed. Contact arm 2, having contacts 3 and 4, reciprocates between pairs of contacts 5 and 6 when the switch is actuated. These elements may be of conventional design and provide only one of the reciprocative devices which may be operated by this invention.

The switch unit is mounted on plate 8 of suitable electrical insulating material attached to end 9 of housing 10 of the shuttle device of this invention. Housing 10, including opposite end 11 and side wall 12, is constructed of a magnetic material. The housing may be cylindrical or other shape as desired. Within the housing tube 13 of nonmagnetic material such as brass extends between ends 9 and 11, and serves as a guide for plunger or shuttle 14 of magnetic material. The latter forms the reciprocative element of the unit, threadably engaging relatively small nonmagnetic rod 15 which in turn projects through the housing and carries contact arm 2 of the switch unit between opposed springs 16 and 17. Thus, reciprocation of plunger 14 causes the switch to be actuated.

Circumscribing tube 13 at the central portion of the housing is permanent magnet 18, the outer surface of which engages side wall 12 of the housing. By this arrangement plunger 14 is located at the axis of the annularly formed permanent magnet. Core elements 19 and 20 are also included in the housing, engaging end walls 9 and 11 thereof and disposed at either end of tube 13. These core elements form stops limiting the travel of plunger 14 and defining the ends of its stroke. Coils 21 and 22 circumscribe tube 13 at its ends being located adjacent the permanent magnet and the walls of the housing.

As illustrated in Fig. 1, no current is flowing through the coils and end 23 of plunger 14 is at rest adjacent core element 20. The spacing of the core elements is such that in this position an air gap 24 is formed between end 25 of the plunger and core element 19. Therefore, the flux field of the permanent magnet 18 is that indicated by arrows A, passing through the path of relatively low reluctance provided by plunger 14, core 20, and walls 11 and 12 of the housing. This causes north and south poles to exist between core 20 and end 23 of the plunger so that an attractive force results and the plunger is held in the position shown. The relatively large air gap 24 between end 25 of the plunger and core 19 provides such a high reluctance drop compared with that of the flux circuit through the other core that for all practical purposes it may be considered that no flux flows through core 19. This concentrates the flux in the circuit formed by core 20 and results in a very high retentive force on plunger 14.

In order to change the position of plunger 14, coils 21 and 22 are energized to provide a magnetic field initially opposing the field of permanent magnet 18, indicated by arrows B in Fig. 2. This flux flows across gap 24 because that is the only way in which the magnetic circuit of the coils can be completed. The flux of the coils is of such value that the reluctance of air gap 24 becomes less for the flux of permanent magnet 18 than the reluctance at core 20 where the coil flux opposes that of the permanent magnet. Therefore, the flux of the permanent magnet seeks to complete the magnetic circuit through what has become its path of least reluctance, namely air gap 24 and core 19, as indicated by arrows C. In this manner the magnetic field of permanent magnet 18 changes direction with respect to plunger 14, tending now to move the plunger toward core 19.

Thus, while the flux of the coils exerts a pull at core 20, a much greater magnetomotive force attracts the plunger toward core 19. This results from the fact that the flux of both the coils and permanent magnet 18 now flow through core 19, while only that of the coils passes through core 20. Because magnetomotive force is directly proportional to the square of flux density, and the flux density at core 19 greatly exceeds that at core 20, the force at the former core will be much larger than at the latter.

Simultaneously with this occurrence, the field of coils 21 and 22 reverses the polarity at core 20. This results in a repelling force on the plunger between the north pole of end 23 and the north pole thereby formed at core 20.

Therefore, with the attractive force of magnet 18 now acting through core 19, and the flux density much greater at this core, plus the repelling force between the adjacent ends of plunger 14 and core 20 now of like polarity, a combination of forces acts to move the plunger through its stroke. These forces unite to impart extremely rapid movement to the plunger, driving it through its stroke to a position adjacent core 19. The force on the plunger actually increases as it approaches core 19 because as gap 24 becomes smaller the reluctance to the flux of the permanent magnet also decreases, and the flux density thereby goes up at core 19. With force being directly proportional to the square of flux density, this factor more than offsets the decrease in repelling force at core 20 as a gap opens up between that core and the plunger. Thus, the plunger accelerates through its stroke.

It should be noted in particular at this point that the coils do not neutralize the permanent magnet, but act to change the direction of its field so that the permanent magnet is employed not only to retain the plunger in position, but also to move the plunger through its stroke. The field of the coils never flows through the permanent magnet.

Normally a pulse of only a few milliseconds duration is required to shift the plunger's position, after which the coils are de-energized and the plunger is retained in its new position seen in Fig. 3 by the flux of permanent magnet 18 in the same manner as described above for the original position of the plunger. The flux field of the magnet then continues through the relatively low reluctance circuit C, and retains the plunger at the opposite end of its stroke adjacent core 19.

If exceptionally large holding power is desired, the current through coils 21 and 22 may be left on, adding to the force retaining the plunger at the end of its stroke. This results from the increased flux density at the core adjacent the plunger where the flux of both the coils and the permanent magnet flow.

Plunger 14 may be returned to its original position simply by reversing the direction of the current through coils 21 and 22 to provide a magnetic field opposite from that described above. The action is then similar to that previously noted, and again the field of the permanent magnet is reversed, to be directed back through core 20, and the forces on the plunger combine to effect its rapid movement through its stroke.

Various coil circuits are possible in actuating the device of this invention. For example, the coils may be connected in series so that the magnetic fields are additive. As shown schematically in Fig. 4, the series connection of coils 21 and 22 means that a positive lead at terminal 28 and a negative lead at terminal 29 will move the plunger in one direction as both coils act to change the flow of the flux of the permanent magnet. Reversal of the polarity of the leads moves the plunger to the opposite end of its stroke.

The coils also may be energized individually by the circuits of Figs. 5 and 6. As shown in the former figure, terminals 30 and 31 are permanently attached to a negative lead. Connection of the other end of coil 21 to a positive lead at terminal 28 will move the plunger in one direction, while connection of terminal 29 of coil 22 to positive will return the plunger. In the circuit of Fig. 6 the coils are selectively energized, with connection of positive to terminal 28 and negative to terminal 30 of coil 21 being used for movement of the plunger in one direction. Return of the plunger is effected by making positive and negative connections to coil 22 at terminals 29 and 31, respectively. In any circuit used the basic operation of the shuttle unit remains unchanged.

The permanent magnet may be formed as a single annular member as illustrated in Fig. 7, or it may be of segmented construction as shown in Fig. 8. In the latter view elements 32 and 33 are individual magnets combined into a single unit provided with axial opening 34 and operative in a manner similar to that of the unitary magnet. Also, the assembly of the permanent magnet may comprise more than two segments.

A modified arrangement of the invention may be seen in Fig. 9 in which only a single coil is used and the magnet is repositioned. Magnet 36 is located at one end of the housing between end wall 11 and a washer or core 37. Single coil 38 is on the opposite side of washer 37. Air gaps 39 and 40 separate permanent magnet 36 and tube 13 and side wall 12 of the housing. The remaining elements are the same as in the previously described embodiment.

In the position of Fig. 9 permanent magnet 36 retains plunger 14 against core 20 by its magnetic field which takes the relatively low reluctance path through this core as indicated by arrows D rather than the very high reluctance circuit that includes air gap 24. When coil 38 is energized to provide flux in the pattern of arrows E, the flux path of the permanent magnet is shifted to circuit F, flowing across air gap 24 and through core 19 as the strong magnetic field of the coil causes this to become the circuit of lower reluctance. Again, as with the previously described embodiment, a combination of forces acts upon plunger 14 rapidly driving it to the opposite end of its stroke where it is adjacent core 19. The field of permanent magnet 36 then retains the plunger in that position until such time as a pulse of current in the reverse direction is sent through coil 38 which shifts the field of the permanent magnet back to its original position and returns the plunger.

This embodiment of the invention has an advantage in simplicity and economy of construction. However, it suffers some loss of efficiency in the circuit of the permanent magnet. The relatively long flux path F results in greater reluctance and higher leakage losses than encountered in the shorter circuit D. Therefore the force exerted on the plunger by the permanent magnet is greater in one direction than it is in the other.

Figs. 10 and 11 illustrate a modification wherein the coils are not subjected to a reversing current, but when energized will always provide a flux flowing in the same direction. Such a unit may be used where provision of a reversing current is not feasible or desirable. Again a permanent magnet is employed in moving and retaining the plunger, but the means for switching the direction of the flux of the permanent magnet is altered to some extent.

For the design of Figs. 10 and 11, the permanent magnet and coils may be similar in arrangement to those of the unit of Figs. 1–3. However, plunger 42 is recessed at end 43 in a conical form, matching a similar projection 44 on core 45. The reason for this will be made more clear hereinafter. On opposite end 46 of plunger 42 a nonmagnetic washer 47 is secured, circumscribing rod 15. Core 48 is provided with a relatively large bevel 49.

In operation of this unit, current through the coils provides a unidirectional flux field G through the plunger as shown in Fig. 10. The field of permanent magnet 18 assumes a pattern H, passing through plunger 42 in the same direction as the flux of the coils and cooperating with the coils in holding the plunger adjacent core 48. However, the magnetic circuit through core 48 is a relatively high reluctance path compared with the designs of the other embodiments of the invention. Washer 47 of nonmagnetic material assures a gap in the magnetic circuit even when the plunger is at the end of its stroke. This reduces the force tending to hold the plunger against core 48. Also, bevel 49 materially reduces the area at adjacent surfaces of plunger 42 and core 48 which further lowers the attractive force between the plunger and the core.

As a result of these factors, when the coils are de-energized the magnet alone exerts a comparatively weak force urging the plunger against core 48. This holding force is insufficient to retain the plunger against the downward reaction of spring 17 which is compressed when the plunger is at the top end of its stroke. Therefore spring 17, acting through arm 2 and fixed contact 3, kicks the plunger away from core 48 to an intermediate position such as seen in Fig. 11. Here the reluctance of flux path H exceeds that of flux path I which the circuit through core 45 presents, so the flux of the permanent magnet shifts to the latter circuit. This effect is enhanced by the complementary conical portions 43 and 44 which considerably increase the area between core 45 and plunger 42, thereby raising the attractive force. This area may be several times that between plunger 42 and the beveled end of core 48. The large force between the plunger and core 45 draws the plunger downwardly from the position of Fig. 11 until it engages core 45 and is retained at the bottom end of its stroke. Subsequent energization of the coils will move the plunger back to the other end of its stroke where it will be held against core 48 as long as current continues to flow through the coils.

Thus, the modification of Figs. 10 and 11 operates on the same general principle of shifting the flux path of a permanent magnet to move and hold the plunger member. However, the permanent magnet retains the plunger only at one end of its stroke, and changing the flux path in one direction is accomplished by mechanical means.

The invention may be modified to the design of Figs. 12 and 13 to provide a simplified arrangement giving more force in one direction of plunger travel than in the other. This type of design may be used with coils which are energizable to provide flux in one direction only as in Figs. 10 and 11. By the embodiment of Figs. 12 and 13 the coils provide an increasing operating force on the plunger as the plunger moves through its stroke. In accomplishing this the reluctance of the coil circuit is lessened as the plunger moves by decreasing the air gap between the plunger and the core elements.

The embodiment of Figs. 12 and 13 requires little structural modification over the previously described arrangements. The main alteration is in the construction of plunger 51, which has projection 52 of magnetic material extending through the axial opening in core 53 to the exterior of the housing. This contrasts with the nonmagnetic rod 15 used with the other embodiments. Included in core 53 around projection 52 of plunger 51 is a sleeve 54 of nonmagnetic material, such as brass.

In the position of Fig. 12 the plunger is at rest adjacent core 53 with the coils de-energized, leaving a gap 55 between the bottom end of the plunger and bottom core 20. In this condition the flux of the magnet follows path J passing upwardly through core 53 to hold the plunger in position as before. If nonmagnetic sleeve 54 were not included it would be possible for the flux of the magnet to pass through magnetic projection 52 of the plunger and from thence to the housing, which would result in loss of the holding power of the magnet. However, the presence of nonmagnetic sleeve 54, despite its relatively thin wall construction, provides a small gap between the core and the plunger in a radial direction. Therefore, the flux of the magnet will take the path of lowest reluctance which is through the axial end of core 53, and which will securely hold the plunger in its upper position of Fig. 12.

When the coils are energized the coil flux follows path K opposing the flux of the magnet through plunger 51, switching the magnet's flux to the opposite direction through the plunger so that it crosses gap 55 to core 20. It should be noted that flux pattern K for the coils passes from the housing radially into projection 52 of plunger sleeve 51 and then axially downward through the plunger. This is because magnetic projection 52 provides the flux path of least reluctance as the plunger begins to move. Thus, as a gap 56 opens up between the plunger and core 53 the coil flux passes through nonmagnetic sleeve 54 and into projection 52 of the plunger rather than crossing gap 56. Sleeve 54 provides little resistance to this flux pattern because it is relatively thin and because a large area is provided around projection 52 at the sleeve. This large area minimizes the effect of the gap from sleeve 54 so that it becomes of negligible effect so far as the coil field is concerned.

As a result of this arrangement the only real gap present for the coil flux circuit is gap 55 between the plunger and core 20. As the plunger moves downwardly toward core 20 this gap decreases thereby decreasing the loss through the circuit for the coils. The single effective gap present for the coil flux circuit becomes smaller as the plunger moves through its stroke. This means that the coils assist the magnet in moving the plunger, providing an ever increasing force as the plunger moves. In the embodiments previously described the gap always became larger at one end of the plunger as it lessened at the other, so that the force exerted by the coils remained relatively constant. However, with the diminishing gap obtained in the present embodiment, the plunger is driven from its top position to the bottom position of Fig. 13 with greater speed and force and is more firmly held against bottom core 20.

The foregoing detailed description is to be clearly understood as given by way of illustration and example only, the spirit and scope of this invention being limited solely by the appended claims.

I claim:

1. A shuttle device comprising a magnetically operable reciprocative member movable through a predetermined stroke, a permanent magnet, a first magnetic circuit for the flux of said magnet, said first magnetic circuit including said reciprocative member and arranged to conduct said flux therethrough in one direction, thereby to urge said reciprocative member toward one end of its stroke, a second magnetic circuit for the flux of said magnet, said second magnetic circuit including said reciprocative member and arranged to conduct said flux therethrough in the opposite direction, thereby to urge said reciprocative member toward the other end of its stroke, and means for selectively switching said flux to either of said circuits.

2. A shuttle device comprising a magnet, a movable member, a duality of magnetic circuits for the flux of said magnet, each of said circuits including said movable member, said movable member being reciprocative through a predetermined stroke relative to said magnet at one end of which said member provides with the first of said circuits a path of relatively low reluctance to the flux of said magnet and is arranged to conduct said flux in one direction for causing said flux to urge said member toward said end of its stroke, and provides with the second of said circuits a path of relatively high reluctance, and at the other end of which said member provides with the second of said circuits a path of relatively low reluctance to the flux of said magnet and is arranged to conduct said flux in the opposite direction for causing said flux to urge said member toward said other end of its stroke, and provides with the first of said circiuts a path of relatively high reluctance, and means for switching said flux from one of said circuits to the other.

3. A device as recited in claim 2 in which said means for switching said flux of said magnet comprises electromagnetic coil means energizable to produce a flux field opposing said flux of said magnet and of sufficient intensity to cause said flux of said magnet to change from one of said circuits to the other.

4. A device as recited in claim 3 in which said circuits include spaced core means between which said movable member is reciprocative, and said movable member includes means providing with one of said core means a path of relatively low reluctance for the flux of said electromagnetic coil means for all positions of said movable member, and providing with the other of said core means a path of relatively high reluctance when said movable member is spaced from said other core means, decreasing as said movable member is moved toward said other core means.

5. A shuttle device comprising a housing, annular permanent magnetic means therein, a reciprocative member axially positioned with respect to said magnetic means and movable through a predetermined stroke, a duality of magnetic circuits for said magnetic means, for one of which the magnetic flux of said magnetic means passes through said reciprocative member in one direction for urging said reciprocative member toward the end of its stroke in one direction, and for the other of which said flux passes through said reciprocative member in the opposite direction for urging said reciprocative member toward the end of its stroke in the opposite direction, one of said circuits providing the path of lower reluctance for said flux when said reciprocative member is at one end of its stroke, and the other of said circuits providing the path of lower reluctance for said flux when said reciprocative member is at the other end of its stroke, and coil means in said housing energizable to produce a flux through said reciprocative member opposing the flux of said magnetic means for switching the flux of said magnetic means from one of said circuits to the other.

6. A shuttle device comprising a housing of magnetic material, a permanent magnet in said housing, a core element in said housing at each of the two opposite ends thereof, a reciprocative member of magnetic material movable through a predetermined stroke between said core elements, said core elements being spaced so that when said reciprocative member is adjacent one of said core elements it is spaced from the other, thereby providing with said housing a flux path of relatively low reluctance through said reciprocative member in one direction and its adjacent core element, and a flux path of high reluctance through said reciprocative member in the opposite direction and the core element spaced therefrom, and coil means in said housing energizeable to produce a flux initially opposing the flux of said permanent magnet and of sufficient magnitude to shift the flux of said permanent magnet from said path of relatively low reluctance to said path through the core element spaced therefrom.

7. A shuttle device comprising a housing having a sidewall and two opposite end walls, an annular permanent magnet in said housing adjacent said side wall at the central portion thereof, a duality of annular coils in said housing located one on either side of said permanent magnet and coaxial therewith, a reciprocative member at the axis of said permanent magnet, a duality of core elements located at the axis of said coils and one adjacent either of said two opposite end walls, said core elements being thereby aligned with said reciprocative member and defining the limits of the stroke thereof, said core elements being spaced a greater distance than the axial length of said reciprocative member, said housing, core elements and reciprocative member thereby forming a single flux circuit for the field of said coils, and a duality of flux circuits for the field of said magnet, one through one of said core elements and the other through the other of said core elements, said coils being energizeable to produce a magnetic field opposing the field of said magnet and of sufficient intensity to switch the flux of said magnet from one of said circuits therefor to the other.

8. A shuttle device comprising a housing, an annular permanent magnet in said housing adjacent the inner surface thereof, at least one coil in said housing coaxial with and adjacent said permanent magnet, a duality of cores in said housing at the axis of said permanent magnet and coil, said cores being in spaced relationship with one core being adjacent each of two opposite end walls of said housing, nonmagnetic guide means defining a linear path between said cores, a reciprocative member of magnetic material in said guide means movable through a stroke between said cores such that at either end of its stroke it is adjacent one of said cores and remote from the other, whereby the flux of said permanent magnet passes through said reciprocative member and the core adjacent thereto and retains said reciprocative member at the end of its stroke, said coil being energizeable to produce a flux opposing the flux of said permanent magnet for switching the flux of said permanent magnet from the core adjacent said reciprocative member to the core remote therefrom, thereby to impose a force on said reciprocative member for moving the same through its stroke.

9. A device as recited in claim 8 in which one of said cores includes an aperture therein, and said reciprocative member is provided with a projection extending into said aperture for all positions of said reciprocative member, thereby to provide a low reluctance flux path between said plunger and said core so provided with an aperture.

10. A shuttle device comprising a housing, an annular permanent magnet therein adjacent one end wall of said housing, an annular coil coaxial therewith and adjacent the opposite end wall of said housing, core means interposed between said coil and said magnet, a second core means at said one end wall at the axis of said magnet, a third core means at said opposite end wall of said housing at the axis of said coil, and a reciprocative member in said housing movable through a stroke between said second and third core means, said coil being energizeable to oppose the flux of said permanent magnet through said reciprocative member for switching the flux path of said permanent magnet from a circuit passing through said reciprocative member in one direction to a circuit passing through said reciprocative member in the opposite direction, whereby said permanent magnet assists in moving said reciprocative member through its stroke when said coil is energized, and retains said reciprocative member at the end of its stroke when said coil is de-energized.

11. An electrical switching device comprising a housing, fixed contacts carried exteriorly thereof, movable contacts for association with said fixed contacts, a rod of nonmagnetic material supporting said movable contacts for effecting the movement thereof, said rod extending into said housing, a reciprocative member in said housing at the axis thereof engaging said rod for effecting movement thereof, nonmagnetic guide means in said housing for confining said reciprocative member to a predetermined linear path, an annular permanent magnet in said housing circumscribing said reciprocative member, at least one coil circumscribing said reciprocative member, a duality of core elements in said housing, said core elements being positioned so that when said reciprocative member is at either end of its stroke it is adjacent one of said core elements and remote from the other, whereby when said reciprocative member is at the end of its stroke a first flux circuit of relatively low reluctance is provided for the flux of said permanent magnet through said housing, said reciprocative member and the core element adjacent thereto, while a second flux circuit of relatively high reluctance is provided by said housing, said reciprocative member and the core element remote therefrom, said coil being energizable to provide a flux field in opposition to that of said permanent magnet of intensity sufficient to switch the field of said permanent magnet from said first circuit to said second circuit, thereby to impose a force on said reciprocative member urging the same through its stroke.

12. A shuttle device comprising a housing of magnetic material, a duality of core elements in said housing spaced one from the other, each core element being in magnetic flux-conductive relationship with said housing, an annular permanent magnet in said housing between said core elements, a reciprocative member of magnetic material movable through a stroke between said core elements, said reciprocative member being spaced from the first of said core elements at one end of its stroke and in adjacent flux-conductive relationship with the second of said core elements for all positions thereof, coil means in said housing for providing a flux field through said reciprocative member for urging said member toward said first core element, and in a direction to oppose the magnetic flux field of said magnet when said reciprocative member is at said one end of its stroke, said flux field of said electromagnetic means being of sufficient intensity to switch the direction of the flux field of said magnet through said reciprocative member.

13. A shuttle device comprising a housing of magnetic material having a side wall and two opposite end walls, an annular permanent magnet in said housing adjacent said side wall at the central portion thereof, a duality of annular coils in said housing located one on either side of said permanent magnet and coaxial therewith, a reciprocative member of magnetic material at the axis of said permanent magnet, a duality of core elements located at the axis of said coils and one adjacent either of said two opposite end walls, said core elements being thereby aligned with said reciprocative member and defining the limits of the stroke thereof, one of said core elements having an axial aperture therein, said reciprocative member having a projection extending into said aperture for all positions of said reciprocative member, a sleeve of relatively thin nonmagnetic material in said aperture interposed between said projection and said one core element for providing a relatively small fixed gap therebetween, said housing, core elements and reciprocative member, including said projection thereof, thereby forming a single flux circuit for the field of said coils, said housing, core elements and reciprocative member thereby forming a duality of flux circuits for the field of said magnet, one axially through one of said core elements and the other axially through the other of said core elements, said coils being energizable to produce a magnetic field opposing the field of said magnet and of sufficient intensity to switch the flux of said magnet from one of said circuits, therefor to the other.

References Cited in the file of this patent
UNITED STATES PATENTS

| 2,268,882 | Lilja | Jan. 6, 1942 |
| 2,505,904 | Matthias et al. | May 2, 1950 |
| 2,759,062 | O'Neill | Aug. 14, 1956 |